(12) United States Patent
Goo

(10) Patent No.: US 7,367,680 B2
(45) Date of Patent: May 6, 2008

(54) COLOR WHEEL UNIT AND OPTICAL ENGINE HAVING THE SAME

(75) Inventor: Gyo-Hwan Goo, Suwon-si (KR)

(73) Assignee: Samsung Electronic Co., Ltd., Suwon-Si (KR)

( * ) Notice: Subject to any disclaimer, the term of this patent is extended or adjusted under 35 U.S.C. 154(b) by 222 days.

(21) Appl. No.: 11/228,306

(22) Filed: Sep. 19, 2005

(65) Prior Publication Data
US 2006/0132720 A1 Jun. 22, 2006

(30) Foreign Application Priority Data
Dec. 20, 2004 (KR) .................. 10-2004-0108836

(51) Int. Cl.
*G03B 21/14* (2006.01)
(52) U.S. Cl. ............................................. 353/84
(58) Field of Classification Search .............. 353/84
See application file for complete search history.

(56) References Cited

U.S. PATENT DOCUMENTS 6,705,733 B1 * 3/2004 Yu et al. .................. 353/84
2005/0168709 A1 * 8/2005 Wu ........................... 353/84
2006/0044526 A1 * 3/2006 Niwa et al. ................ 353/84

FOREIGN PATENT DOCUMENTS

| JP | 2003-50309 | 10/2001 |
| JP | 2001-281562 | 2/2003 |
| KR | 1998-079143 | 11/1998 |

* cited by examiner

*Primary Examiner*—Christopher Mahoney
(74) *Attorney, Agent, or Firm*—Roylance, Abrams, Berdo & Goodman, LLP

(57) ABSTRACT

The present invention relates to a color wheel unit comprising a color wheel having a rotatable filter supporter and a plurality of color filters radially attached to the filter supporter; a color wheel supporter for rotatably supporting the color wheel; a projection provided in at least one of the color filters; and a projection holder for engagement with the projection and provided in at least one of the color filter adjacent to the color filter having the projection and the filter supporter for preventing the color filter from a radial outward breakaway. Thus, the present invention provides a color wheel unit and an optical engine with the same, in which a color filter is stably mounted.

9 Claims, 6 Drawing Sheets

COLOR WHEEL UNIT AND OPTICAL ENGINE HAVING THE SAME

CROSS-REFERENCE TO RELATED APPLICATIONS

This application claims the benefit under 35 U.S.C. § 119(a) of Korean Patent Application No. 2004-0108836, filed on Dec. 20, 2004, in the Korean Intellectual Property Office, the entire disclosure of which is incorporated herein by reference.

BACKGROUND OF THE INVENTION

1. Field of the Invention

The present invention relates to a color wheel unit and an optical engine having the same. More particularly, the present invention relates to a color wheel unit and an optical engine having the same, which has an improved structure of a color filter provided in the color wheel unit.

2. Description of the Related Art

In general, an optical engine is provided in a display apparatus such as a projection television, a projector, or the like, and projects an image on a screen. Such an optical engine is classified into a cathode ray tube (CRT) type, a liquid crystal display (LCD) type, a digital light processing (DLP) type, and the like according to display devices for displaying processed video data.

In particular, the DLP type optical engine comprises a color wheel. Here, the color wheel comprises a plurality of color filters for selectively filtering red (R), green (G) or blue (B) out of white light emitted from a light source.

Here, the color wheel is rotatable for allowing the light emitted from the light source to selectively pass through one of the color filters.

FIG. 1 is a perspective view of a conventional color wheel. As shown therein, a conventional color wheel 110 comprises a plurality of color filters 111 arranged like a disk shape and a filter supporter 121 supporting the plurality of color filters 111.

Each color filter 111 comprises a filter 115 having a fan shape for filtering the light emitted from the light source and a supporter adhering portion 117 disposed radially inside the filter 115 and attached to the filter supporter 121 by an adhesive.

The filter supporter 121 is rotatably coupled with a color wheel supporter (not shown), thereby rotating the color filter 111.

In the conventional color wheel 110, the plurality of color filters 111 are coupled to the filter supporter 121 and the filter supporter 121 is rotatably coupled to the color wheel supporter (not shown). Thus, the plurality of color filters 111 can rotate.

However, in the conventional color wheel, the supporter adhering portion of the color filter is attached to the filter supporter with the adhesive, so that the color filter may be detached from the filter supporter by a centrifugal force at high rotation speed, or by same other force.

Accordingly, a need exists for a color wheel unit with an improved structure capable of attaching a color filter to a filter supporter.

SUMMARY OF THE INVENTION

Accordingly, an aspect of the present invention is to provide a color wheel unit and an optical engine having the same, in which a color filter is stably mounted.

Additional aspects and/or advantages of embodiments of the present invention will be described in part in the following description and, in part, will be obvious from the description, or may be obviously learned by practice of the present invention.

The foregoing and/or other aspects of the present invention are also achieved by providing a color wheel unit comprising a color wheel including a rotatable filter supporter and a plurality of color filters radially attached to the filter supporter, a color wheel supporter rotatably supporting the color wheel, a projection provided in at least one of the color filters, and a projection holder engaged with the projection and provided in at least one of the color filter adjacent to the color filter having the projection and the filter supporter for preventing the color filter from radially breaking away.

According to another aspect of the present invention, the projection protrudes from at least one of the color filters toward the adjacent color filter.

According to another aspect of the present invention, the color filter comprises a supporter coupling portion attached to the filter supporter, a filtering portion outwardly extending from the supporter coupling portion, a projection protruded from a surface of the supporter coupling portion toward the filter supporter, and a projection holder formed on the filter supporter and accommodating the projection.

According to another aspect of the present invention, the color filters comprise at least one narrow color filter narrower than the other color filters and a projection provided in the narrow color filter.

Other aspects of the present invention are also achieved by providing an optical engine for a DLP type, comprising a light source to emit light, a color wheel unit selectively filtering light emitted from the light source, a DLP panel forming an image by adjusting a reflecting angle of the light passed through the color wheel unit, and a projecting lens for projecting the image formed on the DLP panel to a screen.

Other objects, advantages and salient features of the present invention will become apparent from the following detailed description of the embodiments, which, taken in conjunction with the annexed drawings, discloses exemplary embodiments of the invention.

BRIEF DESCRIPTION OF THE DRAWINGS

Throughout the drawings, like reference numerals will be understood to refer to like parts, components and structures.

DETAILED DESCRIPTION OF EXEMPLARY EMBODIMENTS

Reference will now be made in detail to exemplary embodiments of the present invention, examples of which are illustrated in the accompanying drawings.

Figure 1:
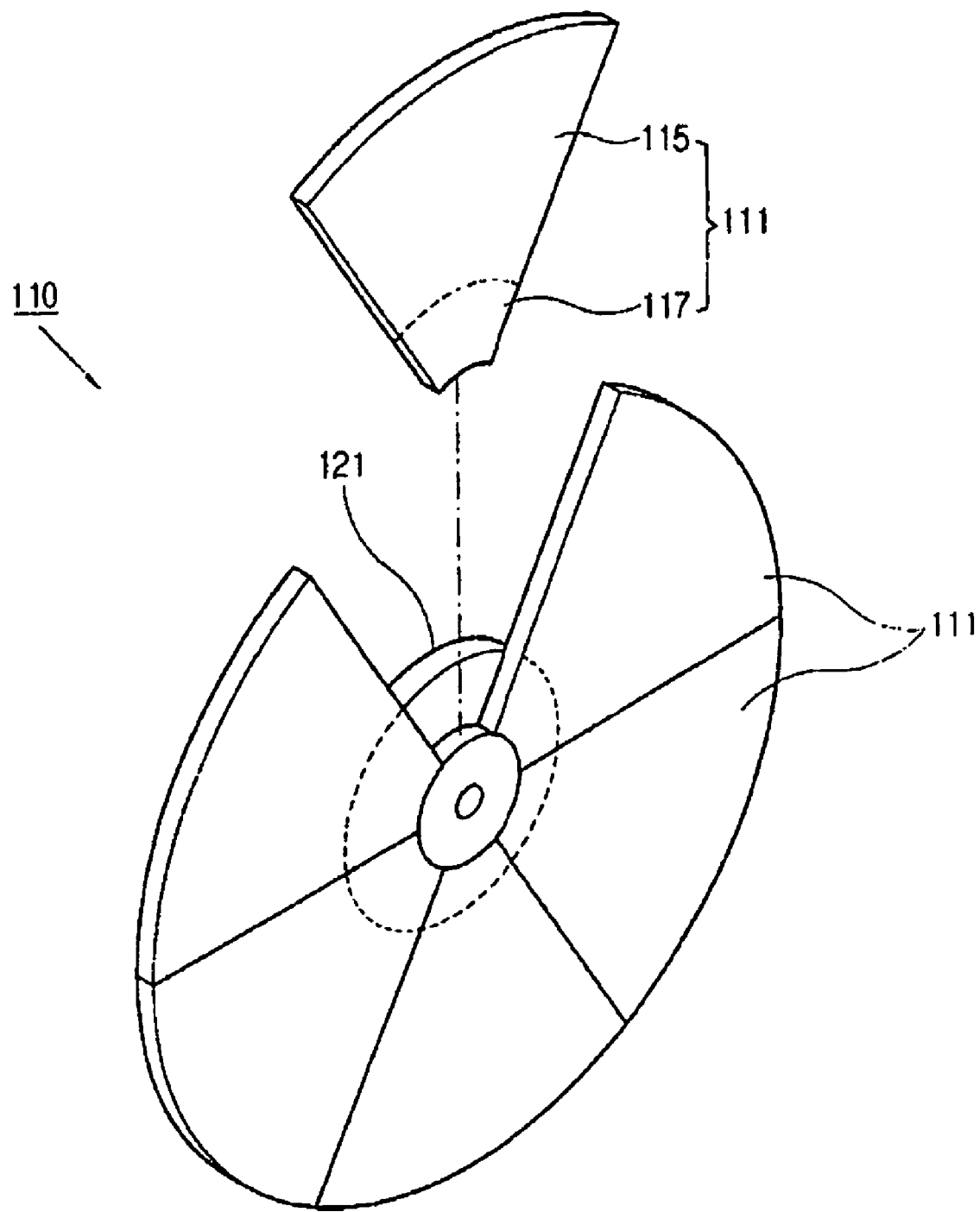
FIG. 1 is a perspective view of a conventional color wheel.
Figure 2:
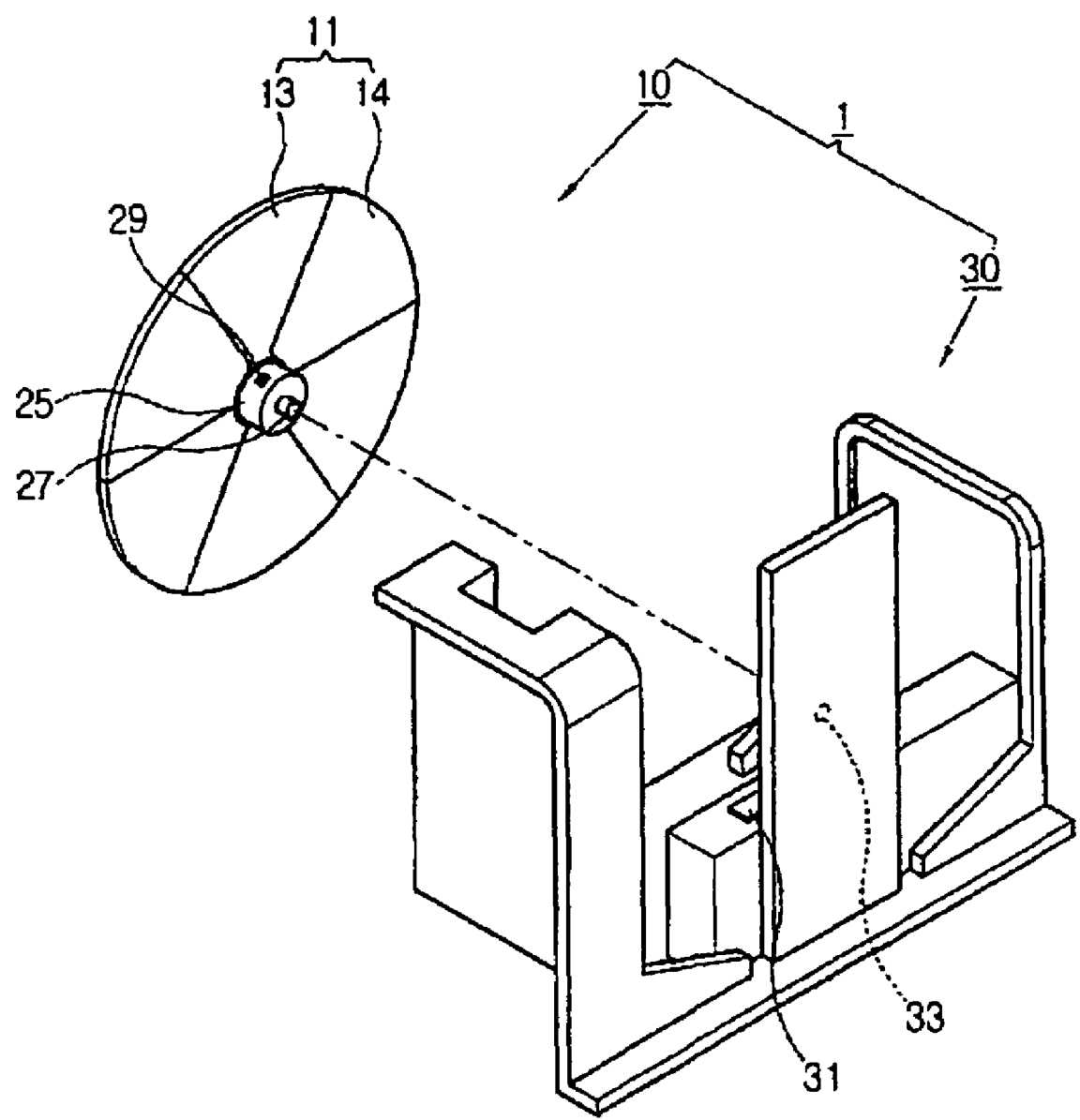
FIG. 2 is an exploded perspective view of a color wheel unit according to an exemplary embodiment of the present invention.
Figure 3:
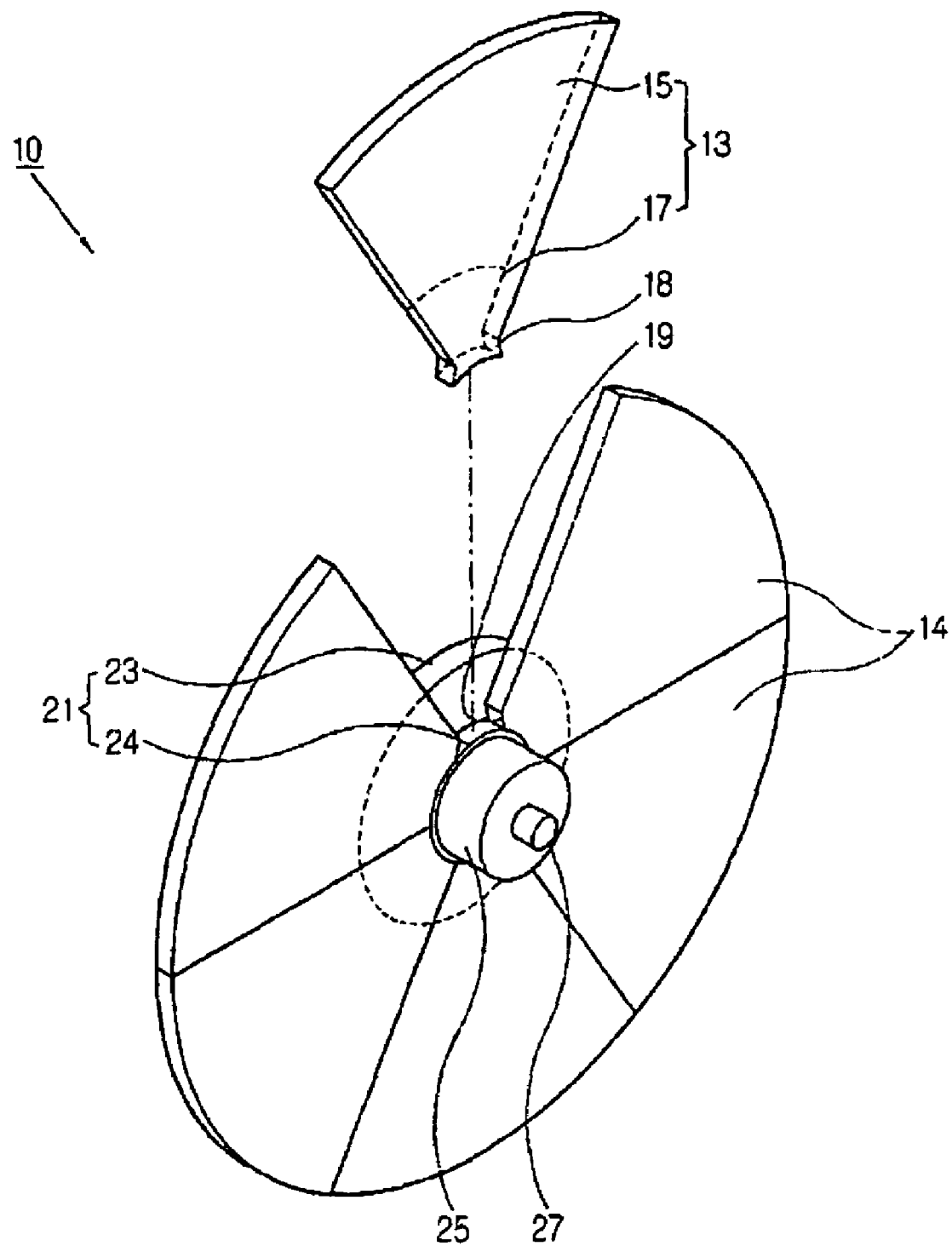
FIG. 3 is an exploded perspective view of a color filter provided in the color wheel unit of FIG. 2.
Figure 4:
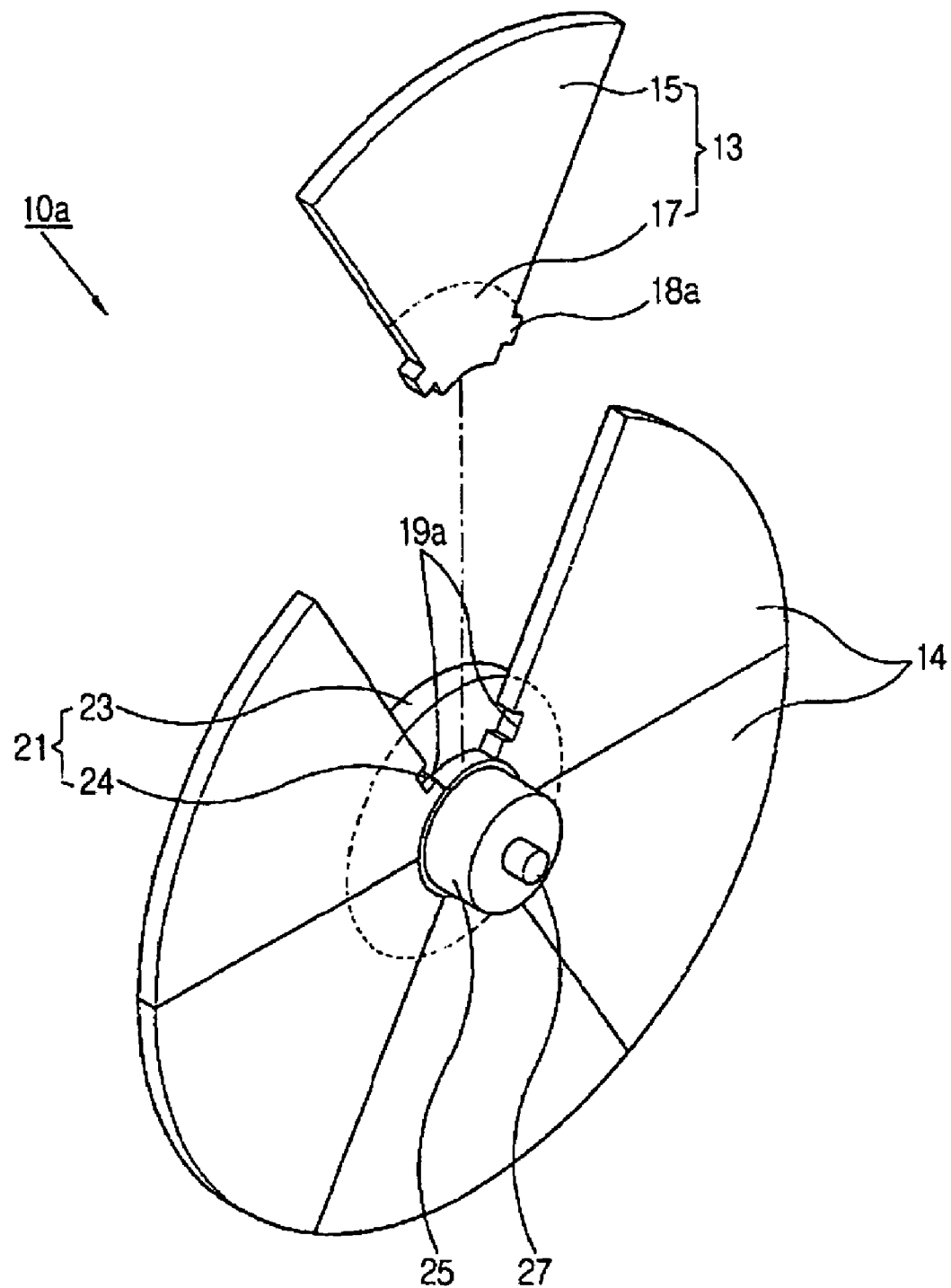
FIG. 4 is an exploded perspective view of another color filter provided in the color wheel unit according to an exemplary embodiment of the present invention.

As shown in FIGS. 2 through 4, a color wheel unit 1 according to an exemplary embodiment of the present invention comprises a color wheel 10 for selectively filtering red (R), green (G) or blue (B) out of light emitted from a light source and a color wheel supporter 30 for rotatably supporting the color wheel 10. According to an exemplary embodiment of the present invention, the color wheel unit 1 further comprises a motor body 25 coupled to a filter supporter 21 of the color wheel 10 for rotating integrally with the filter supporter 21 and a motor shaft 27 coupled to the color wheel supporter 30 for allowing the motor body 25 to rotate. According to an exemplary embodiment of the present invention, the color wheel unit 1 further comprises a sensor 31 provided in the color wheel supporter 30 and an index part 29 either provided in a predetermined region of the color wheel 10 or the motor body 25 for irregularly reflecting the light emitted from the sensor 31.

The color wheel 10 has a disk shape and is generally mounted in a DLP type optical engine. The color wheel 10 comprises the filter supporter 21 rotatably coupled to the color wheel supporter 30 and a plurality of color filters 11 radially attached to the filter supporter 21. One of the color filters 11 is formed with at least one projection 18 protruding toward at least one adjacent other color filter 11. The adjacent other color filter 11 is formed with a projection holder 19 to be engaged with the projection 18, for thereby preventing the color filter 11 from radially breaking away.

The plurality of color filters 11 selectively filters the red (R), the green (G) and the blue (B) out of the light emitted from the light source, respectively. Each color filter 11 has a fan shape and is coupled to the filter supporter 21. Further, each color filter 11 comprises a supporter coupling portion 17 attached to the filter supporter 21 and a filtering portion 15 outwardly extending from the supporter coupling portion 17. Here, at least one of the color filters 11 is a narrow color filter 13 narrower than the other color filters 11. That is, the plurality of color filters 11 comprises the narrow color filter 13 and regular color filters 14 wider than the narrow color filter 13.

The supporter coupling portion 17 is placed in an inner portion of the color filter 11 and coupled to a filter coupling portion 23 of the filter supporter 21 by an adhesive. Alternatively, the connection between the supporter coupling portion 17 and the filter coupling portion 23 is not limited to the adhesive, and may be achieved by various methods.

The filtering portion 15 is a region for substantially filtering the red (R), the green (G) and the blue (B) out of the light emitted from the light source.

The narrow color filter 13 is narrower than the regular color filter 14 and thus has a light passing time less than the regular color filter 14. Here, the narrow color filter 13 has a narrow angular width as compared with the regular color filter 14. Consequentially, the supporter coupling portion 17 of the narrow color filter 13 to contact the filter supporter 21 is also narrower than the regular color filters 14. Because the supporter coupling portion 17 of the narrow color filter 13 is narrower than the regular color filters 14, adhesive force between the narrow color filter 13 and the filter supporter 21 is weaker than between the regular color filter 14 and the filter supporter 21. In general, the narrow color filter 13 passes black, dark green, or the like for thereby clearing light and darkness of a dark image. Alternatively, the narrow color filter 13 is not limited to the black, the dark green, or the like, and may pass light of various colors.

According to an exemplary embodiment of the present invention, the projection 18 protrudes from the narrow color, filter 13 toward adjacent regular color filters 14. Further, the projections 18 are provided in opposite sides of the narrow color filter 13, respectively. Preferably, the projection 18 is placed in the supporter coupling portion 17 of the narrow color filter 13, but may be placed in the filtering portion 15 of the narrow color filter 13. Referring to FIG. 3, a pair of projections 18 protrudes from an inner end of the supporter coupling portion 17 of the narrow color filter 13 toward the adjacent regular color filter 14. Referring to FIG. 4, a pair of projections 18a in a color wheel 10a can protrude from the opposite sides of the supporter coupling portion 17 of the narrow color filter 13 toward the adjacent regular color filter 14. Alternatively, the projections 18 and 18a are not limited to the narrow color filter 13, and may be placed in the regular color filter 14.

The projection holder 19 is placed in the regular color filter 14 adjacent to the narrow color filter 13 and engaged with the projection 18. Consequentially, the projection 18 is prevented from radially breaking away from the filter supporter 21. As shown in FIG. 3, the projection holder 19 is formed by cutting an inner end of the regular color filter 14 adjacent to the narrow color filter 13 in order to hold the projection 18 formed in the inner end of the supporter coupling portion 17 of the narrow color filter 13. Alternatively, as shown in FIG. 4, a projection holder 19a may be formed by recessing a lateral side of the regular color filter 14 adjacent to the narrow color filter 13 in order to accommodate the projection 18a formed in the opposite sides of the supporter coupling portion 17 of the narrow color filter 13.

The filter supporter 21 is shaped like a circular plate. Further, the filter supporter 21 comprises the filter coupling portion 23 to which the supporter coupling portion 17 of the color filter 11 is attached and a motor body coupling portion 24 placed in the center of the filter supporter 21 and coupled with the motor body 25. Thus, the plurality of color filters 11 are radially attached to the filter supporting portion 23 of the filter supporter 21. The filter supporter 21 is integrally coupled with the motor body 25 and rotates integrally with the motor body 25. Here, the filter supporter 21 is made of aluminum. Alternatively, the filter supporter 21 can be made of any suitable material so long as it can support the plurality of color filters 11.

The motor body 25 comprises an outer side rotatably coupled to the filter supporter 21 for rotating integrally with the filter supporter 21 and an inner side coupled to the motor shaft 27 and supported by the color wheel supporter 30. Alternatively, the motor body 25 may be supported by the color wheel supporter 30, and the motor shaft 27 may be coupled to the filter supporter 21 and allowing the filter supporter 21 to rotate. The outer circumference of the motor body 25 has a cylindrical shape and is made of a material capable of reflecting light from the sensor 31 to the sensor 31. For example, the outer circumference of the motor body 25 is made of aluminum.

The color wheel supporter 30 is formed with a shaft coupling portion 33 to be coupled with the motor shaft 27 for rotatably supporting the color wheel unit 1. Alternatively, when the motor shaft 27 is coupled with the filter supporter 21, the color wheel supporter 30 may be coupled with the motor body 25 for rotatably supporting the color wheel unit 1.

The sensor 31 is provided in the color wheel supporter 30 and emits light to the index part 29. The index part 29 is provided on the outer circumference of the motor body 25 for irregularly reflecting the light emitted from the sensor 31. Alternatively, the index part 29 may be provided in the filter supporter 21.

With this configuration, the color wheel 10 of the color wheel unit 1 according to an exemplary embodiment of the present invention is assembled as follows.

First, the adhesive is applied onto the filter coupling portion 23 of the filter supporter 21, and then the plurality of color filters 11 are attached to the filter coupling portion 23. At this time, the projection 18 of the narrow color filter 13 is engaged with the projection holder 19 of the regular color filter 14 adjacent to the narrow color filter 13. Thus, the color wheel 10 is stably supported by the color wheel supporter 30, so that the narrow color filter 13 is prevented from radially breaking away due to the centrifugal force even though the color wheel unit 1 rotates at high speed.

In the color wheel unit according to an exemplary embodiment of the present invention, at least one of the color filters supported by the filter supporter is provided with the projection, and the adjacent color filter is provided with the projection holder to which the projection engaged in a direction lateral to the radial direction of the filter supporter, so that the color filter is stably mounted even though the color wheel rotates at high speed.

Figure 5:
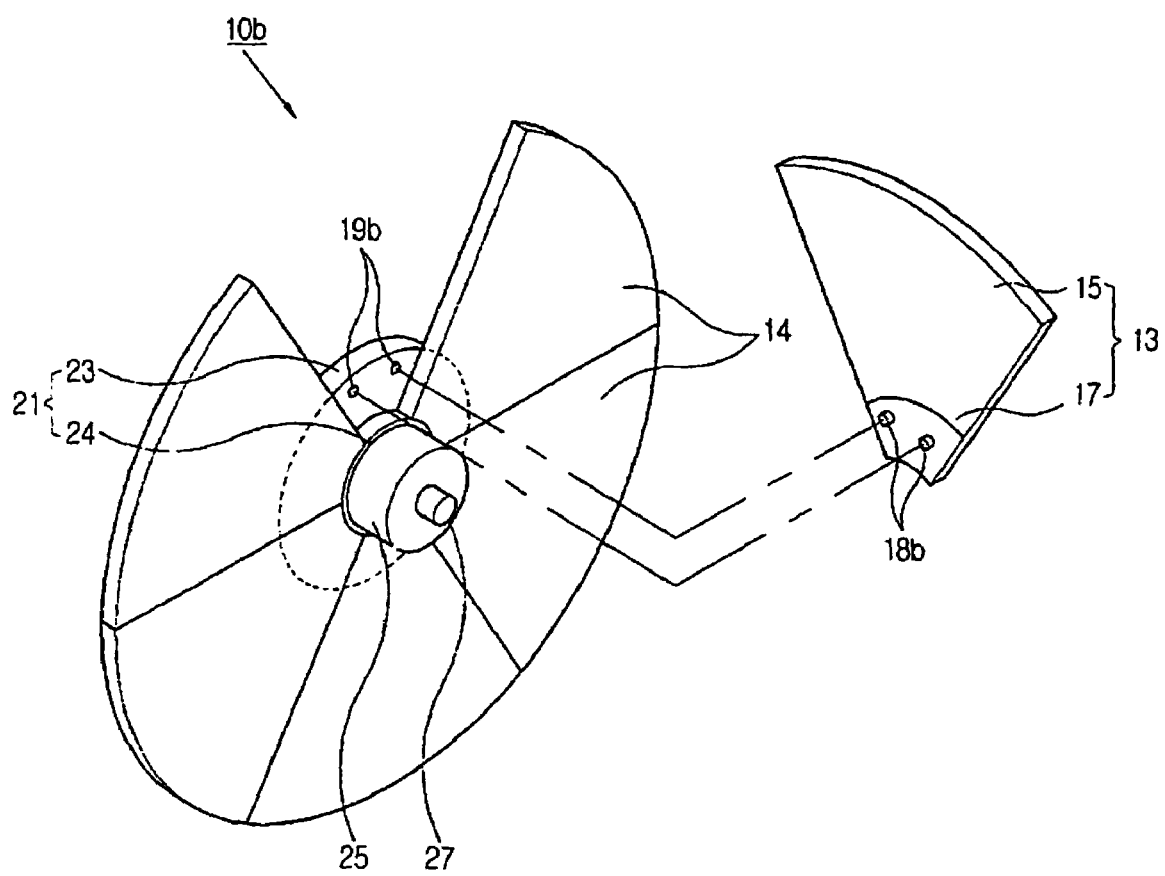
FIG. 5 is an exploded perspective view of a color filter provided in a color wheel unit according to an exemplary embodiment of the present invention.

FIG. 5 is an exploded perspective view of a color filter provided in a color wheel unit according to an exemplary embodiment of the present invention. As shown therein, in a color wheel 10*b* according to an exemplary embodiment of the present invention, a projection 18*b* is formed on a surface of the supporter coupling portion 17 of at least one color filter 14, and a projection holder 19*b* is formed on the filter supporter 21 and accommodates the projection 18*b*.

According to an exemplary embodiment of the present invention, the pair of projections 18*b* is formed on the surface of the supporter coupling portion 17 of the narrow color filter 13. Alternatively, a single projection, or three, or more projections may be formed on the surface of the supporter coupling portion 17 of the narrow color filter 13. Further, the projection may be formed on a surface of the supporter coupling portion 17 of the regular color filter 14.

The projection holder 19*b* is recessed on the filter coupling portion 23 of the filter supporter 21 and accommodates the projection 18*b* in order to prevent the narrow color filter 13 from radially breaking away due to a centrifugal force when the color wheel 10*b* rotates at the high speed.

In the color wheel unit according to an exemplary embodiment of the present invention, at least one of the color filters supported by the filter supporter is provided with the projection, and the filter supporter is provided with the projection holder to which the projection engaged in a direction lateral to the radial direction of the filter supporter, so that the color filter is stably mounted even though the color wheel rotates at high speed.

Figure 6:
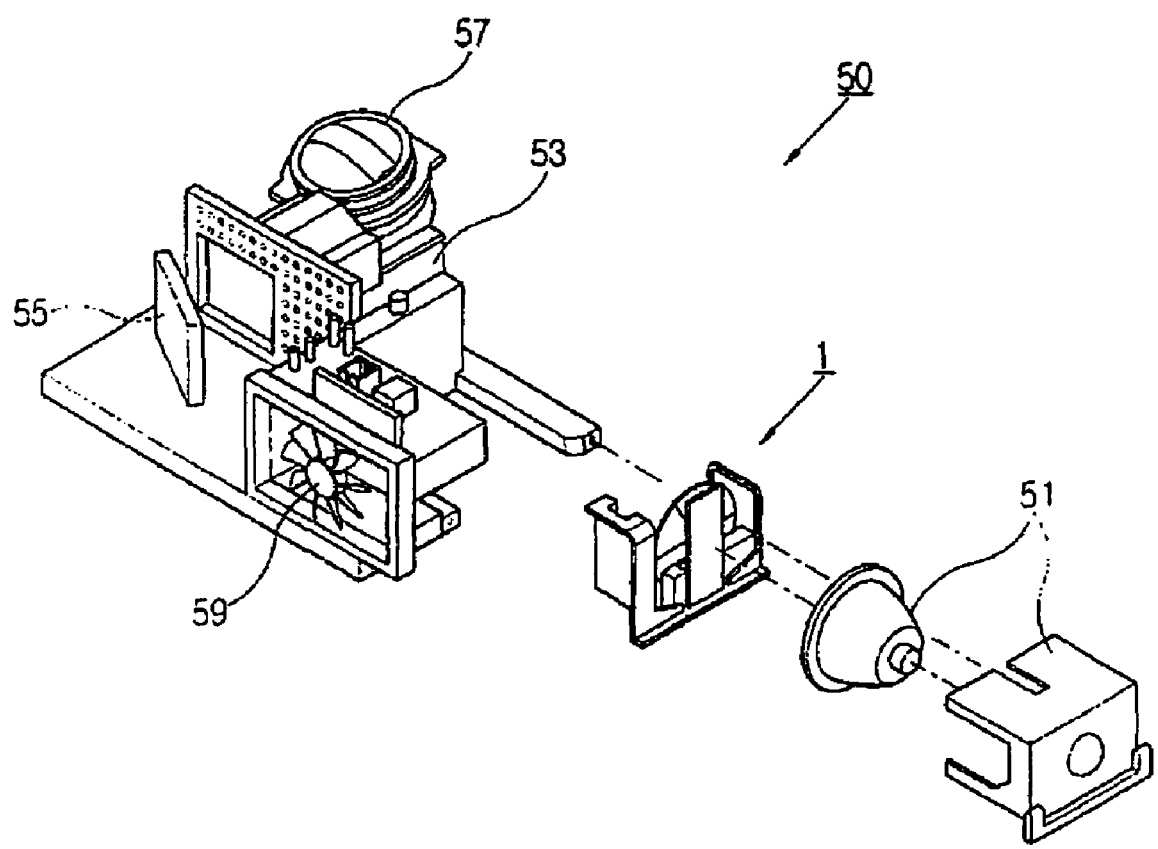
FIG. 6 is an exploded perspective view of an optical engine according to an exemplary embodiment of the present invention.

FIG. 6 is an exploded perspective view of an optical engine according to an exemplary embodiment of the present invention. As shown therein, an optical engine 50 according to an exemplary embodiment of the present invention comprises a light source 51 emitting light in a DLP manner, a color wheel unit 1 for selectively filtering the light emitted from the light source 51, a DLP panel 55 for forming an image by adjusting a reflection angle of the light passed through the color wheel unit 1, and a projecting lens 57 for projecting the image formed on the DLP panel 55 to a screen (not shown). According to an exemplary embodiment of the present invention, the optical engine 50 further comprises an optical unit 53 interposed between the light source 51 and the color wheel unit 1 or between the color wheel unit 1 and the DLP panel 55 for uniformizing the light and a cooling fan 59 for cooling the light source 51, the color wheel unit 1 or the like, which radiate heat of high temperature.

The light source 51 includes an arc-discharging lamp such as a mercury lamp, a metal halide lamp, a xenon lamp, or the like. When the light source 51 emits light, heat of high temperature is radiated.

With this configuration, the optical engine 50 according to an exemplary embodiment of the present invention is mounted to a projection television or a projector for projecting an image on the screen.

Thus, the optical engine according to an exemplary embodiment of the present invention comprises the color wheel unit, of which the projection is provided in at least one of the color filters, and the projection holder engaged with the projection so as to prevent the color filters from radially breaking away. Accordingly the color filter is stably mounted even though the color wheel rotates at high speed.

As described above, the present invention provides a color wheel unit and an optical engine with the same in which a color filter is prevented from radially breaking away even though a color wheel rotates at high speed, thereby stably mounted.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A color wheel unit comprising:
   a color wheel including a rotatable filter supporter, and a plurality of color filters radially attached to the filter supporter;
   a color wheel supporter for rotatably supporting the color wheel;
   a projection provided in at least one of the color filters; and
   a projection holder for engaging with the projection and for preventing the color filter from radially breaking away,
   wherein the projection holder is provided in at least one of the color filters adjacent to the color filter having the projection and the filter supporter.

2. The color wheel unit according to claim 1, wherein the projection protrudes from at least one of the color filters toward the adjacent color filter.

3. The color wheel unit according to claim 1, wherein the color filter comprises:
   a supporter coupling portion attached to the filter supporter; and
   a filtering portion extending radially from the supporter coupling portion.

4. The color wheel unit according to claim 1, wherein the color filters comprises at least one narrow color filter narrower than the other color filters; and
   the projection is provided in the narrow color filter.

5. An optical engine for a Digital Light Processing (DLP) apparatus, comprising:
   a light source for emitting light;
   a color wheel unit for selectively filtering light emitted from the light source, wherein the color wheel unit comprises:

a color wheel including a rotatable filter supporter and a plurality of color filters radially attached to the filter supporter;

a color wheel supporter rotatably supporting the color wheel;

a projection provided in at least one of the color filters; and a projection holder engaged with the projection, wherein the projection holder is provided in at least one of the color filters adjacent to the color filter having the projection and the filter supporter for preventing the color filter from radially breaking away;

a DLP panel for forming an image by adjusting a reflecting angle of the light passed through the color wheel unit; and a projecting lens for projecting the image formed on the DLP panel to a screen.

6. The optical engine according to claim 5, wherein the projection protrudes from at least one of the color filters toward the adjacent color filter.

7. The optical engine according to claim 5, wherein the color filter comprises:

a supporter coupling portion attached to the filter supporter; and a filtering portion outwardly extending from the supporter coupling portion.

8. The optical engine according to claim 5, wherein the color filters comprise at least one narrow color filter narrower than the other color filters; and the projection is provided in the narrow color filter.

9. A method of manufacturing a color wheel in a Digital Light Processing (DLP) apparatus, the method comprising the steps of:

providing projections in at least one of color filters; and providing projection holders for engaging with the projections and for preventing the color filters from radially breaking away, wherein the projection holders are provided in at least one of the color filters adjacent to the color filter having the projections and a filter supporter.

* * * * *